(12) United States Patent
Barnes

(10) Patent No.: US 11,005,879 B2
(45) Date of Patent: May 11, 2021

(54) PEER DEVICE PROTECTION

(71) Applicant: Webroot Inc., Broomfield, CO (US)

(72) Inventor: Paul Barnes, Derby (GB)

(73) Assignee: Webroot Inc., Broomfield, CO (US)

( * ) Notice: Subject to any disclaimer, the term of this patent is extended or adjusted under 35 U.S.C. 154(b) by 290 days.

(21) Appl. No.: 16/018,156

(22) Filed: Jun. 26, 2018

(65) Prior Publication Data

US 2019/0007447 A1    Jan. 3, 2019

Related U.S. Application Data

(60) Provisional application No. 62/526,573, filed on Jun. 29, 2017.

(51) Int. Cl.
| | |
|---|---|
| *H04L 29/06* | (2006.01) |
| *H04L 29/08* | (2006.01) |
| *H04L 12/24* | (2006.01) |
| *H04W 12/00* | (2021.01) |
| *H04L 12/26* | (2006.01) |
| *H04W 84/18* | (2009.01) |
| *H04W 4/70* | (2018.01) |

(52) U.S. Cl.
CPC .......... *H04L 63/1441* (2013.01); *H04L 41/12* (2013.01); *H04L 43/04* (2013.01); *H04L 63/1416* (2013.01); *H04L 63/1425* (2013.01); *H04L 63/1433* (2013.01); *H04L 63/304* (2013.01); *H04L 63/306* (2013.01); *H04L 67/104* (2013.01); *H04L 67/30* (2013.01); *H04L 67/303* (2013.01); *H04W 12/00508* (2019.01); *H04W 4/70* (2018.02); *H04W 84/18* (2013.01)

(58) Field of Classification Search
CPC ... H04L 63/1408–1425; H04L 63/1441–1491; H04L 67/30; H04L 67/104; H04L 63/304; H04L 63/306; H04L 41/12
See application file for complete search history.

(56) References Cited

U.S. PATENT DOCUMENTS

| | | | |
|---|---|---|---|
| 8,893,278 B1 * | 11/2014 | Chechik | H04L 63/145 |
| | | | 713/188 |
| 10,061,916 B1 * | 8/2018 | Jiang | G06F 21/316 |
| 2005/0053000 A1 * | 3/2005 | Oliver | H04L 41/0893 |
| | | | 370/231 |
| 2005/0144288 A1 * | 6/2005 | Liao | H04L 63/145 |
| | | | 709/227 |
| 2007/0150558 A1 | 6/2007 | Teodosiu | |

(Continued)

*Primary Examiner* — Matthew T Henning
(74) *Attorney, Agent, or Firm* — Sprinkle IP Law Group

(57) ABSTRACT

Peer device protection enables a first device comprising a digital security agent to remedy security issues on (or associated with) a set of devices visible to the first device. The first device may comprise a digital security agent may identify a set of devices visible to the first device. The first device may monitor the set of devices to collect data, such as types of communications and data points of interest. The digital security agent may apply threat detection to the collected data to identify anomalous network behavior. When anomalous network behavior is detected, the first device may cause an indicator of compromise (IOC) to be generated. Based on the IOC, the first device may facilitate remediation of the anomalous network behavior and/or apply security to one or more devices in the set of devices.

20 Claims, 4 Drawing Sheets

(56) References Cited

U.S. PATENT DOCUMENTS

| | | | | |
|---|---|---|---|---|
| 2008/0148403 A1* | 6/2008 | Manion | ............... | G06F 21/56 |
| | | | | 726/22 |
| 2008/0313500 A1* | 12/2008 | Strauss | ............ | H04L 67/104 |
| | | | | 714/37 |
| 2009/0119747 A1* | 5/2009 | Pierer | ............... | H04L 67/104 |
| | | | | 726/1 |
| 2009/0172815 A1* | 7/2009 | Gu | .................... | H04L 63/145 |
| | | | | 726/23 |
| 2010/0083381 A1* | 4/2010 | Khosravi | .......... | G06F 21/564 |
| | | | | 726/24 |
| 2017/0220799 A1* | 8/2017 | Tinsley | ............... | H04L 67/10 |
| 2017/0250998 A1* | 8/2017 | Miliefsky | ........... | H04L 63/02 |
| 2018/0097843 A1* | 4/2018 | Bursell | ............... | H04L 63/20 |

* cited by examiner

PEER DEVICE PROTECTION

CROSS-REFERENCE TO RELATED APPLICATIONS

This application claims the benefit of U.S. provisional application No. 62/526,573, filed Jun. 29, 2017, entitled "Peer Device Protection," which application is incorporated herein by reference in its entirety.

BACKGROUND

Cybersecurity has become a paramount concern in the ever-expanding realm of the internet of things (IoT) network. Historically, cybersecurity has been implemented and monitored on individual endpoint agents. However, many IoT devices are configured proprietarily and/or cannot support endpoint agents. As a result, such IoT devices are not only vulnerable to malicious attacks, but also introduce vulnerability points to other devices sharing a network with the IoT devices.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for peer device protection. Peer device protection enables a first device comprising a digital security agent to actively and/or passively detect, mitigate, prevent and/or remediate security issues on (or associated with) a set of devices visible to the first device. In aspects, a first device comprising (or having access to) a digital security agent or similar security solution may identify a set of devices visible to the first device. The first device may monitor the set of devices to collect data, such as types of communications and data points of interest. The digital security agent may apply threat detection to the collected data to identify anomalous network behavior. When anomalous network behavior is detected, the first device may cause an indicator of compromise (IOC) to be generated. Based on the IOC, the first device may facilitate remediation of the anomalous network behavior and/or apply security to one or more devices in the set of devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
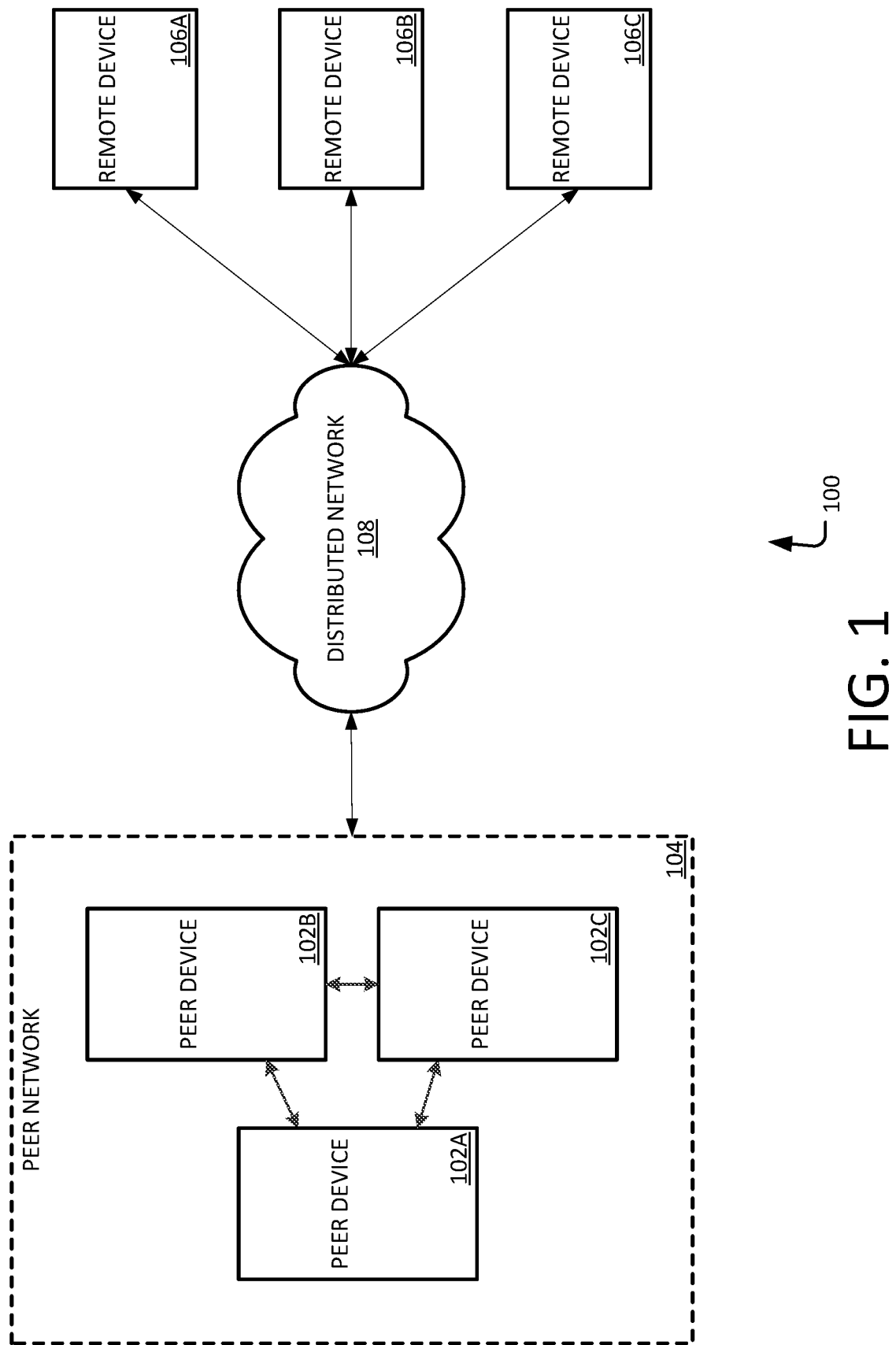
FIG. 1 illustrates an overview of an example system for peer device protection as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describe systems and methods for peer device protection. Peer devices, as used herein, may refer to two or more computing devices that are connected to or visible to one another via a network or similar connection. In some aspects, peer devices may share similar architectures, configurations, privileges and permission sets, resources (e.g., disk storage, CPUs, etc.), applications/programs, etc. without requiring centralized coordination by, for example, a host or server device. In other aspects, peer device may be dissimilar in type, operating systems, capabilities, etc. For example, one or more peer devices in a network may be IoT devices. The IoT devices may comprise limited processing capacity and configurability. Accordingly, such IoT devices may not be installed with a security solution and/or may not be capable of installing a security solution. As a result, a peer device having access to one or more sources of cybersecurity (e.g., a peer security device) may be used to provide security for peer devices that do not (and cannot) access to cybersecurity. Examples of cybersecurity sources include computer code instruction sets, security services, security programs/applications, security agents, and the like. The cybersecurity may provide for actively and/or passively detecting, mitigating, preventing and/or remediating security issues. In examples, cybersecurity sources may be located or installed locally to the peer security device, remotely to the peer security device, or some combination thereof. As a particular example, a security agent for detecting and/or remediating security threats may be installed directly on the peer security device.

In aspects, the peer security device may detect and/or identify a set of devices visible and/or accessible to the peer security device. The set of devices may comprise one or more devices that are peer devices to the peer security device. The peer devices may include devices such as mobile devices, laptops, desktop PCs, tablets, wearable devices, etc. The peer security device may monitor the peer devices and network communications thereof to collect and/or detect data, such as network and/or device events, network information, device information, device types and identifiers, instruction sets and scripts, files and documents, data objects, etc. The monitoring may include active monitoring techniques (e.g., remote port scans, device pen tests, etc.) or passive monitoring techniques (e.g., monitoring network traffic, event logs, etc.). The peer security device may evaluate the data collected/detected via the monitoring by applying one or more of the cybersecurity sources (or features thereof). As a result of the evaluation, network behavior of the monitored peer devices may be identified and/or classified as anomalous. When anomalous network behavior is detected, the peer security device may cause an indicator of compromise (IOC) to be generated. An IOC, as used herein, may refer to an artifact or event observed in a network or operating environment that indicates a high probability of a security threat or attack. A non-exhaustive list of IOCs include atypical account and/or network activity, unusual configuration changes, virus signatures, URLs, domain names, IP addresses, wireless radio signals, ciphers and hashes, embedded scripts, device names/types, port probing, etc. Based on the determined IOC(s), the peer security device may facilitate remediation of the anomalous network behavior by, and/or apply security to, one or more of the peer devices. In examples, facilitating the remediation may include using the peer security device to execute a security service against the peer device, installing security on the peer device, modifying the configuration of one or more network devices (e.g., a firewall, a router, etc.) or peer devices, interrupting the network traffic between an attacker/suspicious device and a peer device, leveraging a third party security solution, etc.

Accordingly, the present disclosure provides a plurality of technical benefits including but not limited to: actively and passively monitoring peer device network behavior; applying threat detection to peer devices not having enabled security using a security-enabled peer device; generating IOCs on behalf of a peer device not having enabled security; installing security on a peer device not having enabled security; using a device to remediate a security issue on a peer device; reducing the resource expenditure to provide security to one or more peer devices; providing cascading security to new and existing peer devices; applying machine learning techniques to evaluate network traffic; providing real-time threat analysis to peer networks; and improved efficiency and quality for applications/services utilizing examples of the present disclosure, among other examples.

FIG. 1 illustrates an overview of an example system for peer device protection, as described herein. Example system 100 presented is a combination of interdependent components that interact to form an integrated whole for peer device protection systems. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the example operating environments depicted in FIG. 4. In other examples, the components of systems disclosed herein may be spread across multiple devices. For instance, input may be entered on a client device and information may be processed or accessed from other devices in a network, such as one or more server devices.

As one example, the system 100 comprises client devices 102A-C, peer network environment 104, remote devices 106A-C, and distributed network 108. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client devices 102A-C may represent peer devices of peer network 104. The peer devices may be of various types, models, configurations and/or capabilities. In examples, at least one of the peer devices may have access to one or more sources of cybersecurity, while at least one of the peer devices may not. The cybersecurity sources may be located or installed locally to the peer device, remotely to the peer device, or some combination thereof. For instance, client device 102A may be installed with a security agent (not shown) for actively and/or passively detecting, mitigating, preventing and/or remediating security issues detected in peer network 104; whereas, client devices 102B and 102C may not comprise (or have access to) the security agent or comparable security utilities. Alternatively, client device 102A may comprise an API or a service that interacts, via distributed network 108, with a security utility on one or more remote devices, such as remote devices 106A-C. Remote devices 106A-C may represent devices that are not connected or visible to one or more of the peer devices.

Peer network 104 may enable client devices 102A-C to access and transmit data to each other without the use of a centralized system or a client-server model. Alternately, peer network 104 may comprise a centralized component or architecture that facilitates the client-server model. In addition to client devices 102A-C, peer network 104 may comprise one or more network devices, such as a firewall (not shown), a gateway (not shown), or the like. In aspects, client device(s) having access to cybersecurity may monitor the network communication and behaviors of peer devices on peer network 104. In examples, the monitoring by the client device may include active monitoring and/or passive monitoring. For example, client device 102A (installed with a security agent) may actively monitor client devices 102B and 102C by periodically performing port scans to identify unsecured ports. As another example, client device 102A (installed with a security agent) may passively monitor client devices 102B and 102C by continuously monitoring communications between local network devices, inbound communications from remote devices and communications between peer devices. In some examples, the monitoring by the client device may include recording data to one or more data stores (not shown) assessable to peer network 104. In aspects, peer network 104 may provide client devices 102A-C access to remote services and/or devices, such as remote devices 106A-C, via distributed network 108. Client device(s) having access to cybersecurity may monitor the network communications between devices on peer network 104 and remote devices. The monitoring may include the active and passive monitoring techniques described above.

In aspects, client devices 102A-C may be configured to apply threat detection techniques to the data monitored and/or recorded on peer network 104. Threat detection techniques may include the use of security tools and utilities associated with virus detection, threat vector generation and analysis, URL analysis, malware detection, network analysis (e.g., traffic analysis, protocol analysis, wireless radio scanning, etc.), endpoint analysis, threat models, etc. The threat detection techniques may be used identify anomalous network behavior and events associated with one or more peer devices. In examples, identifying anomalous network behavior and events may include comparing recorded network activity to one or more device and/or network profiles, applying machine learning or a set of rules to network activity, evaluating the recorded activity against a list (e.g., a white list, black list, etc.) of known devices/services or features, evaluating one or more network trends/analyses, evaluating recorded data values against one or more threshold values, etc. In some aspects, when anomalous network activity is detected, client devices 102A-C may cause one or more indicators of compromise (IOC) to be generated or determined. For example, client device 102A (installed with a security agent) may generate an IOC corresponding to anomalous network activity between client device 102B and a remote device. Based on the IOC, one or more client devices having access to a source of cybersecurity may facilitate the remediation of the anomalous network behavior associated with one or more of the peer devices. In examples, facilitating the remediation may include providing the determined IOC to a remediation component, evaluating the IOC to determine a corresponding remedial action, reporting the IOC, initiating a remedial action, etc.

Figure 2:
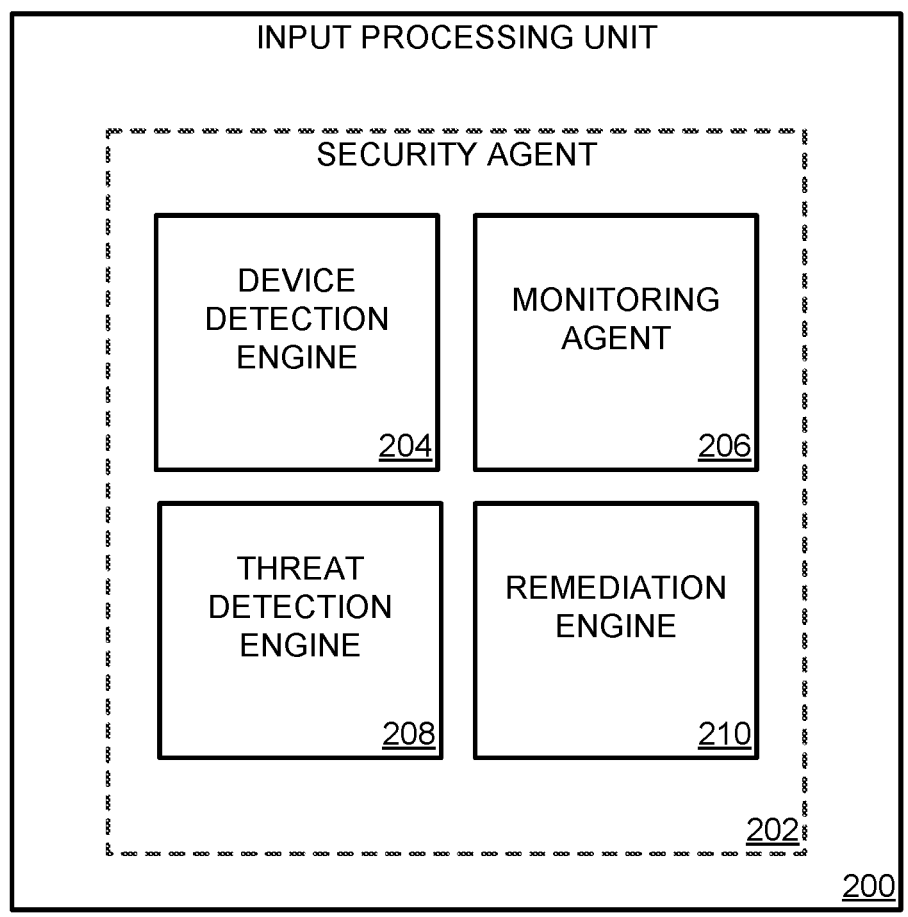
FIG. 2 illustrates an example input processing unit for implementing peer device protection as described herein.

FIG. 2 illustrates an overview of an example input processing device 200 for peer device protection, as described herein. The peer device protection techniques implemented by input processing device 200 may comprise the peer device protection techniques and content described in FIG. 1. In alternative examples, a single system (comprising one or more components such as processor and/or memory) may perform processing described in systems 100 and 200, respectively.

With respect to FIG. 2, input processing unit 200 may comprise security agent 202. Security agent 202 may provide for actively and/or passively detecting, mitigating, preventing and/or remediating security issues on (or associated with) a set of devices visible to input processing unit 200. In aspects, security agent 202 may comprise or otherwise interface with device detection engine 204, monitoring agent 206, threat detection engine 208 and remediation engine 210.

Device detection engine 202 may be configured to detect or identify devices on a network, such as peer network 104. In aspects, device detection engine 202 may identify the devices connected to a network. To identify the devices, device detection engine 202 may use a network scanning utility, listener component and/or discovery protocols to detect when devices connect to (or attempt to connect to) a network or another device. The identification may include determining device information (e.g., identifier, type, configuration, address, etc.), determining user information (e.g., identifier, group/member data, permission sets, etc.), evaluating network activity and behavior, etc. Device detection engine 202 may record the identified device data over a period of time in one or more data stores (not shown). In one example, the data in the data stores may be used to generate a time-based perspective of detected devices.

Monitoring agent 204 may be configured to monitor the communications and behaviors of one or more devices. In aspects, monitoring agent 204 may comprise one or more monitoring modes. The monitoring modes may be used to monitor network activity on a shared network or communication link. Examples of such networks/communication links include IP networks, cellular networks, over-the-air (OTA) networks, Bluetooth communications, near-field communications (NFC), etc. In examples, the monitoring modes of monitoring agent 204 may include a passive monitoring mode. The passive monitoring mode may enable monitoring agent 204 to perform passive monitoring of communications between peer devices and communications between one or more peer devices and a remote device using, for example, a network scanning utility, listener component and/or discovery protocols. In one example, monitoring agent 204 may comprise a promiscuous mode, in which all (or substantially all) network data packets received by input processing unit 200 (or the peer network thereof) are processed and/or evaluated. The promiscuous mode may enable monitoring agent 204 to collect additional data about the devices connected to (or attempting to connect to) a network. In some examples, the monitoring modes of monitoring agent 204 may additionally or alternately include an active monitoring mode. The active monitoring mode may enable monitoring agent 204 to proactively request data packets and information from peer and/or remote devices at periodic intervals, on demand, or upon the satisfaction of one or more criteria. As an example, monitoring agent 204 may perform (or cause the performance of) periodic penetration tests of peer devices and peer device networks to detect vulnerabilities, such as software flaws and weaknesses, unoptimized hardware configurations, unauthorized hardware/software modifications, rogue access points, etc. As another example, monitoring agent 204 may cause a third party service to assess the security and/or exposure of one or more peer devices, or the authorization of one or more access points.

Monitoring agent 204 may further be configured to build a behavior profile. In aspects, monitoring agent 204 may use monitored data to build one or more device and/or network behavior profiles. Such behavior profiles may describe or represent expected behavior, events and/or states for one or more users, accounts, devices, device types, networks, or the like. For example, a behavior profile may be generated for each peer device visible to input processing unit 200. The behavior profiles may be stored, visualized and/or manipulated by a user interface element (not shown) accessible to monitoring agent 204.

Threat detection engine 208 may be configured to evaluate monitored data. In aspects, threat detection engine 208 may comprise (or have access to) one or more data evaluation utilities, such as decision logic, one or more rule sets, or machine learning models. A model, as used herein, may refer to a predictive or statistical language model that may be used to determine a probability distribution over one or more word, character sequences or events, and/or to predict a response value from one or more predictors. In examples, a model may be a rule-based model, a machine-learning regressor, a machine-learning classifier, a neural network, or the like. Threat detection engine 208 may apply such data evaluation utilities to the data monitored by monitoring agent 204. For example, threat detection engine 208 may apply machine learning techniques to a set of monitored data for peer devices of input processing unit 200. Applying the machine learning techniques may include parsing the monitored data to generate a set of features, and using the set of features to construct one or more feature vectors. A feature vector, as used herein, may refer to an n-dimensional vector of numerical features that represent one or more objects. Threat detection engine 208 may then evaluate the feature vectors to determine whether the monitored data represents, or is otherwise indicative of, anomalous device or network behavior. In examples, evaluating the feature vectors may include comparing the monitored data to one or more behavior profiles, evaluating the monitored data against a list (e.g., a white list, black list, etc.) of known devices/services or features/events, evaluating one or more network trends/analyses, generating one or more threat metrics, comparing threat metrics to one or more threshold values, etc.

Threat detection engine 208 may further be configured to generate indicators of compromise (IOCs). In aspects, when threat detection engine 208 identifies anomalous device or network behavior, an IOC representative of the anomalous behavior may be generated. The IOC may comprise an identifier, one or more keywords, a link (e.g., to support documentation, FAQs, a remedy agent, network activity data, etc.), an executable script, a set of instructions, etc. In some examples, threat detection engine 208 may generate the IOC. In other examples, security agent 202 may provide one or more of the generated feature vectors to a separate component, such as an issue tracking utility, a notification generation utility, or the like. The separate component, which may be implemented locally or remotely to input processing device 200, may then generate and/or track the IOC.

Remediation engine 210 may be configured to perform one or more remediation actions when anomalous activity is identified. In aspects, remediation engine 210 may have access to one or more IOCs. The IOCs may be indicative of a security threat or attack to a peer device or peer device network. Remediation engine 210 may evaluate an IOC to determine an appropriate set of actions that may be performed to remedy the threat to the peer device/network. Evaluating an IOC may comprise parsing the IOC to identify an identifier or keyword, and using the identified information to determine a threat type. In some examples, remediation engine 210 may use the determined threat type to initiate (or suggest the initiation of) an action. In other examples, remediation engine 210 may initiate (or schedule the initiation of) an action based on an on-demand user request or the fulfillment of a set of criteria. Non-exhaustive examples of actions available to remediation engine 210 may include causing security agent 202 to install itself (or a copy or instance thereof) on one or more peer devices, executing a threat solution for a peer device using the security agent of a separate peer device (such as input processing device 200), modifying the configuration of one or more network devices (e.g., a firewall, a router, etc.) or peer devices, interrupting the network traffic between an attacker/suspicious device and a peer device and leveraging an external security solution to apply security to one or more peer devices based on an IOC.

Having described various systems that may be employed by the aspects disclosed herein, this disclosure will now describe one or more methods that may be performed by various aspects of the disclosure. In aspects, method 300 may be executed by an example system, such as system 100 of FIG. 1. In examples, method 300 may be executed on a device, such as input processing unit 200, comprising at least one processor configured to store and execute operations, programs or instructions. However, method 300 is not limited to such examples. In other examples, method 300 may be performed on an application or service for providing peer device protection. In at least one example, method 300 may be executed (e.g., computer-implemented operations) by one or more components of a distributed network, such as a web service/distributed network service (e.g. cloud service).

Figure 3:
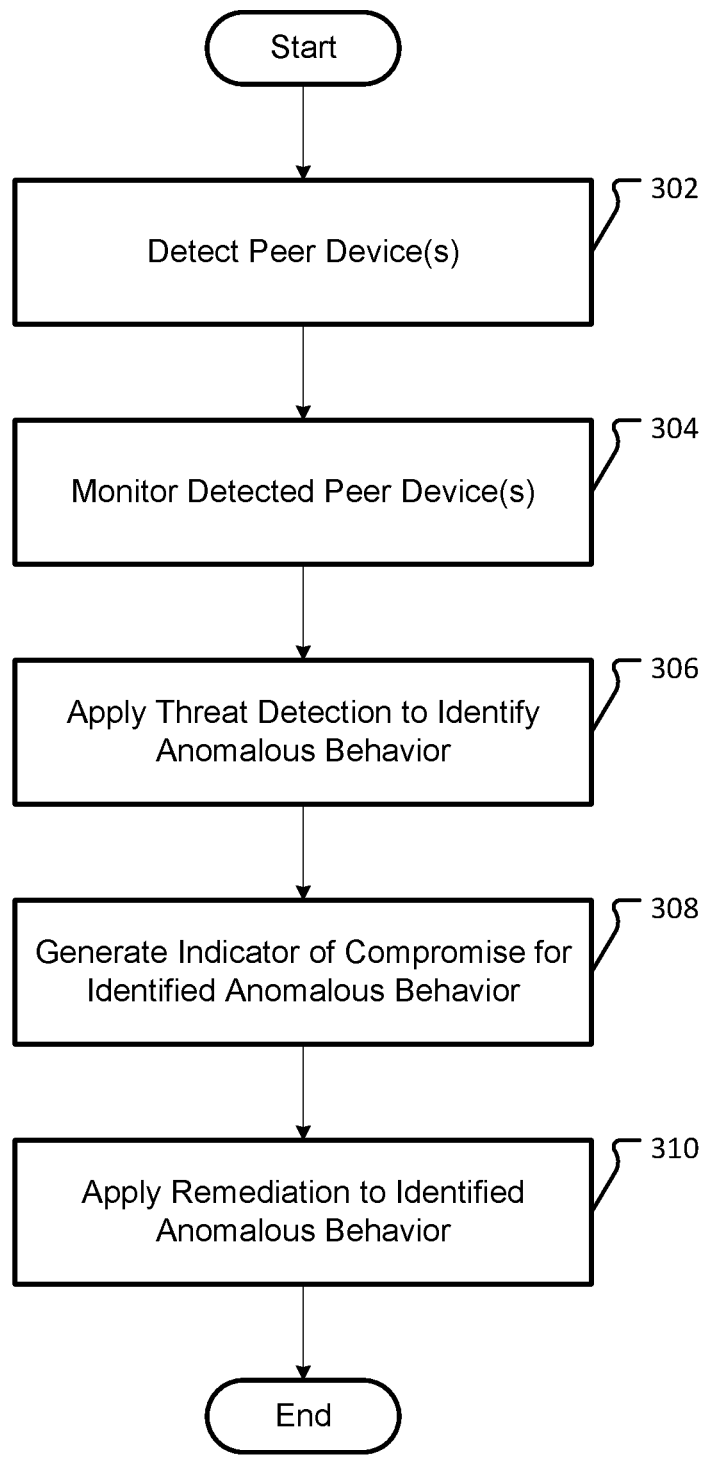
FIG. 3 illustrates an example method for implementing peer device protection as described herein.

FIG. 3 illustrates an example method 300 for peer device protection, as described herein. Example method 300 begins at operation 302, where one or more peer devices may be detected by a security device. In aspects, a security device having access to one or more cybersecurity solutions, such as security agent 202, may be connected to a network or communication link (e.g., a peer network) comprising one or more peer devices. The cybersecurity solution may provide for detecting, mitigating, preventing and/or remediating security issues detected in the network. The security device may have access to a network detection utility, such as device detection engine 204. The network detection utility may implement tools, such as a network scanning utility, listener component and/or discovery protocols. The security device may use such a network detection utility to detect the various device states of peer devices on the network. For example, the network detection utility may detect when peer devices connect to the network, disconnect from the network, change power states (e.g., enter/exit sleep mode or an idle state), etc. A list of devices and/or device states detected using the network detection utility may be generated and stored in one or more data stores. The list may comprise data related to device identification information (e.g., identifier, type, configuration, address, etc.), user information (e.g., identifier, group/member data, permission sets, etc.), activity information (e.g., network join/exit times and entry points), device state, network stat, etc.

At operation 304, one or more peer devices may be monitored by a security device. In aspects, a security device may monitor each peer device detected on a peer network using a monitoring utility, such as monitoring agent 206. The monitoring may comprise one or more passive monitoring techniques. In examples, a passive monitoring mode may enable the security device to passively monitor communications between peer devices (e.g., devices connect to the peer network), communications between one or more peer devices and one or more remote devices, network activity, etc. For instance, a mobile device comprising a security solution may be connected to a peer network. The mobile device may implement or utilize a passive monitoring mode incorporating a promiscuous setting or mode. In at least one example, the promiscuous setting (or a different network monitoring setting) may be implemented by a network device, such as a firewall or router. The promiscuous mode may enable the security device to access and/or process all (or substantially all) of the network data packets received by, and transferred within, the peer network; thereby, providing the security device a more comprehensive view of the peer network health and behavior.

In some aspects, the monitoring by the security device may additionally or alternately comprise active monitoring techniques. In examples, the security device may request data packets and information from peer devices and/or remote devices at periodic intervals, on demand, or upon the satisfaction of one or more criteria. For instance, a mobile device comprising a security solution may be connected to a peer network. The mobile device may perform periodic penetration tests (e.g., simulated attacks on a computing system or device) of peer devices to identity security vulnerabilities. Alternately, the mobile device may cause a remote device or service to assess the security and/or exposure of one or more peer devices. As an example, the mobile device may solicit a cloud-based service outside of the peer network to monitor public exposure of the peer network and/or one or more peer devices on the peer network. The cloud-based service may initiate active monitoring of the peer network (or devices thereon) when a new device joins (or attempts to join) the peer network, or based on some other criteria.

In aspects, the monitored data may be used to create one or more device and/or network behavior profiles. The behavior profiles may comprise or represent expected behaviors, events and states for one or more users, accounts, devices, device types, networks, or the like. For example, the security device may generate a behavior profile for each peer device that has connected to the peer network, one or more network devices of the peer network, peer device types/models, remote devices and device types, domains names and addresses, etc. The behavior profiles may comprise timestamps, join/exit events, device state information, network state information, trust levels, etc. The behavior profiles may be stored and used for device authorization and/or threat detection.

At operation 306, threat detection may be applied to monitored data. In aspects, a threat detection utility, such as threat detection engine 208, may have access to the monitored data. The security device may apply one or more data evaluation utilities (e.g., decision logic, rule sets, machine learning models, etc.) to the monitored data. For example, the threat detection utility may apply machine learning techniques to a set of monitored data for peer devices on a peer network. Applying the machine learning techniques may include parsing the monitored data to generate or identify a set of network/device behavior features. Each behavior feature may represent an individual measurable property of a network transmission or an observed device/network event. The set of behavior features may be used to construct one or more feature vectors. The threat detection utility may then evaluate the feature vectors to determine whether the monitored data represents, or is otherwise indicative of, anomalous device or network behavior. In examples, evaluating a feature vector may include comparing the data comprised in the feature vectors to one or more behavior profiles generated in operation 304. For instance, the feature vector data may be compared to expected login events (e.g., authorization information, login times/locations, etc.) and network activity (e.g., search topics, dwell duration, stylistic consistencies in user input/signals, etc.) for a peer device or peer device type. In other examples, evaluating a feature vector may include evaluating the feature vector data against a list (e.g., a white list, black list, grey list, etc.) of known (or suspicious) virus definitions, events, device types, device addresses, domains, or the like. In yet other examples, evaluating a feature vector may include applying a feature vector to a behavior model. For instance, a behavior model may receive a feature vector as input. The behavior model may evaluate each feature of the feature vector to generate one or more threat values/metrics. The threat values/metrics may represent the probability that a feature is representative of anomalous or malicious activity. The behavior model may then apply a behavioral algorithm to one or more of the threat values/metrics to generate an overall threat score for the one or more activities or states represented by the feature vector.

At operation 308, one or more IOCs may be generated. In aspects, if anomalous activity is detected or suspected by the threat detection utility described in operation 306, one or more IOCs representative of the anomalous activity may be generated. The IOC may comprise one or more identifiers, one or more keywords, a link (e.g., to support documentation, FAQs, a remedy agent, network activity data, etc.), an executable script, a set of instructions, etc. For example, the threat detection utility may assign to a feature vector a threat score indicating a high probability that a remote device is (or was previously) attempting a denial of service (DoS) attack. In response to the threat score, a DoS-specific IOC may be generated. The DoS-specific IOC may comprise an IOC identifier, a description of the identified anomalous behavior (e.g., the DoS attack), a link to a DoS FAQ, and an embedded script. The embedded script may enable a user to initiate a remedy by clicking on (or otherwise activating) the embedded script. As one example, the embedded script may comprise a link that, when activated, terminates communication between a peer device (or network device) and the remote device performing the DoS attack. As another example, the embedded script may be operable to classify the remote device performing the DoS attack as a threat, and add the remote device to one or more lists (e.g., a black list or a grey list).

At operation 310, a remedy may be applied to anomalous behavior. In aspects, a remediation utility, such as remediation engine 210, may have access to one or more of the IOCs. The remediation utility may evaluate IOCs to determine an appropriate set of actions available to be performed in order to remedy a threat to peer devices or the peer device network. Non-exhaustive examples of actions available to the remediation utility may include installing (or causing to be installed) a security solution on one or more peer devices, using the security device to execute a security solution for a peer device, modifying the configuration of one or more network devices (e.g., a firewall, a router, etc.) or peer devices, interrupting the network traffic between a remote device and a peer device, interrupting the network traffic between peer devices, and leveraging an external security solution to apply security to one or more peer devices. In aspects, evaluating an IOC may comprise searching or parsing the IOC to determine action-identifying information, sources to perform actions, threat classifications or analyses, or the like. As an example, an IOC may be parsed to identify an identifier or keyword(s) associated with the detected anomalous behavior. The identifier/keyword may be used to identify or classify a type of threat or type of behavior. For instance, an IOC comprising details related to a detected DoS attack may comprise the keywords "DoS attack." The keywords "DoS attack" may be provided to a search utility correlating keywords to one or more services, scripts and/or suggested actions. In response, the search utility may provide suggested actions (e.g., "terminate connection," "black list remote device," "report remote device") and corresponding scripts or instruction sets. In response to selecting an action or an associated instruction set, the corresponding script may be executed and the suggested action may be performed. In another example, an IOC may comprise an overall threat score indicating a probability of anomalous activity on a peer network. The IOC may be evaluated against a set of rules comprising value ranges (e.g., threat score ranges) and corresponding threat classifications. For instance, a rule set may specify that values 0-60 represent "no threat," values 61-90 represent "suspected threat," and values 91-100 represent "known threat." The rule set may additionally specify that values 0-60 prompt no action to be taken, values 61-90 represent prompt a security scan of a peer device, and values 91-100 represent prompt a security solution tailored to the known threat type.

Figure 4:
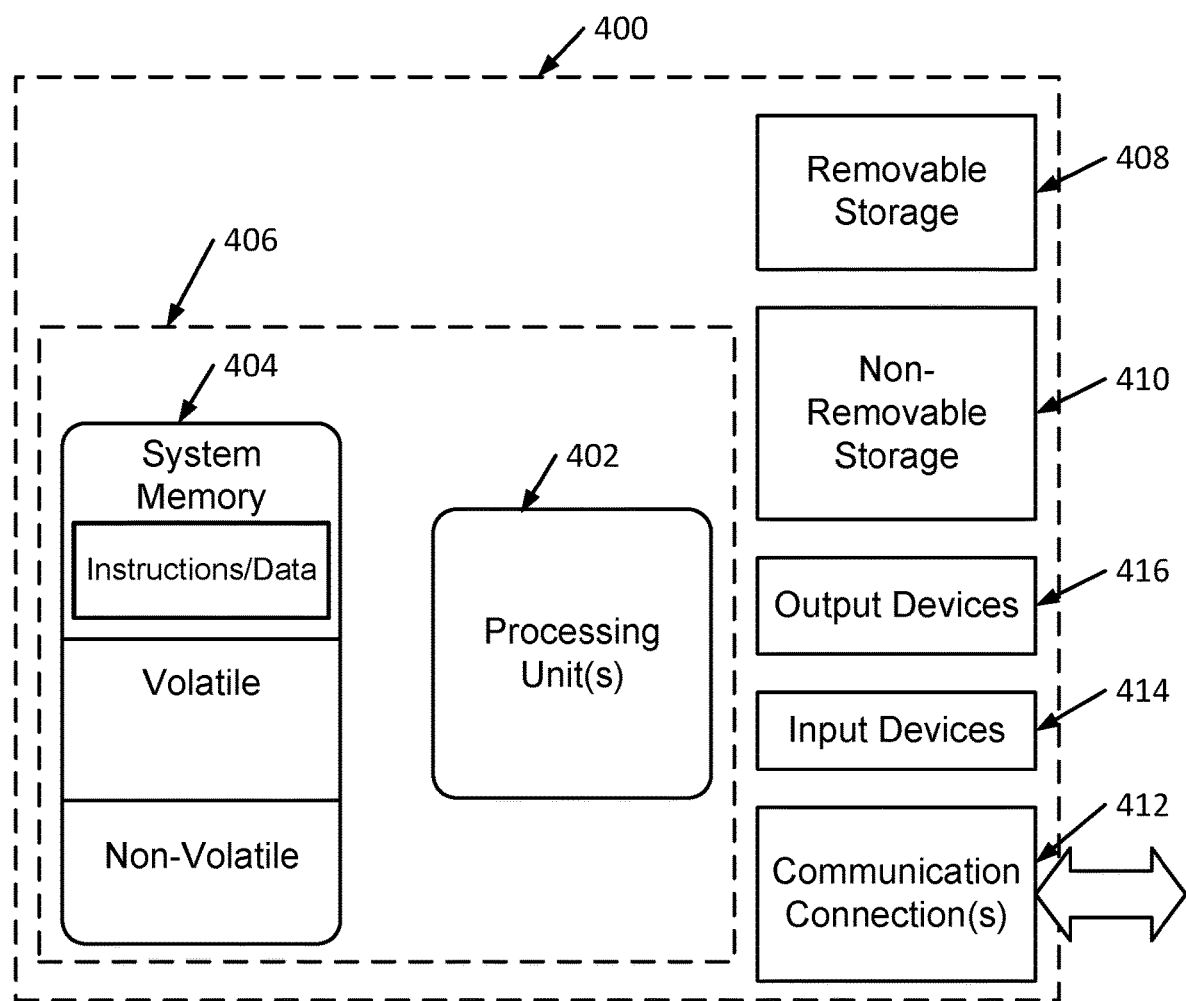
FIG. 4 illustrates one example of a suitable operating environment in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, monitored data, threat detection data, IOC data, instructions to perform the methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure provide a system comprising: at least one processor; and memory coupled to the at least one processor, the memory comprising computer executable instructions that, when executed by the at least one processor, performs a method for peer device protection, the method comprising: detecting one or more peer devices on a network; monitoring, by a security device, the detected one or more peer devices to generate monitored data, wherein the security device is a peer of the one or more peer devices and comprises a security solution; applying, by the security device, threat detection to the monitored data to identify anomalous behavior; generating one or more indicators of compromise corresponding to the identified anomalous behavior; and based on the one or more indicators of compromise, using the security device to remediate the identified anomalous behavior. In some examples, detecting the one or more peer devices comprises recording at least one of: peer device identification information, user information and network activity information. In some examples, the monitoring comprises using a passive monitoring mode, wherein the passive monitoring mode enables the security device to passively monitor communications between the one or more peer devices and passively monitor communications between the one or more peer devices and one or more remote devices. In some examples, monitoring comprises using an active monitoring mode, wherein the active monitoring mode enables the security device to request data packets and information from the one or more peer devices. In some examples, the monitoring comprises using an active monitoring mode, wherein the active monitoring mode enables the security device to cause a remoted device external to the network to assess at least one of the one or more peer devices. In some examples, the monitored data is used to generate one or more behavior profiles representing at least one of expected behavior, expected network events, expected device states and expected network states. In some examples, the one or more behavior profiles comprise at least one of: network join events, network exit events, device state information, network state information and device trust levels. In some examples, applying threat detection comprises: parsing the monitored data to generate or identify a set of behavior features; using the set of behavior features to construct one or more feature vectors; and evaluating the one or more feature vectors to determine whether the monitored data is indicative of anomalous activity. In some examples, evaluating the one or more feature vectors comprises evaluating the one or more feature vectors against at least one of: a behavior profile, a set of virus definitions, a list of device identifiers, a list of network identifiers and a behavioral model. In some examples, evaluating the one or more feature vectors further comprises: generating one or more threat values for features of the one or more feature vectors; and applying the one or more threat values to a behavioral algorithm to generate an overall threat score. In some examples, the one or more indicators of compromise comprise at least one of: an identifier, a set of keywords, a link, an executable script and a set of instructions. In some examples, remediating the identified anomalous behavior comprises at least one of: installing the security solution on at least one of the one or more peer devices; executing a security solution for at least one of the one or more peer devices, wherein the security solution is executed from the security device; modifying the configuration of one or more network devices on the network; modifying the configuration of one or more peer devices; interrupting the network traffic between at least two of the one of the one or more peer devices; interrupting the network traffic between at least one of the one of the one or more peer devices and a remote device; and leveraging an external security solution to apply security to at least one of the one or more peer devices.

Aspects of the present disclosure further provide a method for peer device protection, the method comprising: detecting one or more peer devices on a network; monitoring, by a security device, the detected one or more peer devices to generate monitored data, wherein the security device is a peer of the one or more peer devices and comprises a security solution; applying, by the security device, threat detection to the monitored data to identify anomalous behavior; generating one or more indicators of compromise corresponding to the identified anomalous behavior; and based on the one or more indicators of compromise, using the security device to remediate the identified anomalous behavior. In some examples, detecting the one or more peer devices comprises using at least one of: a network scanning utility, a listener component and discovery protocols. In some examples, the monitored data is used to generate one or more behavior profiles representing at least one of expected behavior, expected network events, expected device states and expected network states. In some examples, the threat detection comprises the use of at least one of: virus detection, threat vector generation and analysis, URL analysis, malware detection, network analysis, endpoint analysis and one or more threat models. In some examples, the monitoring comprises using a passive monitoring mode, wherein the passive monitoring mode enables the security device to passively monitor communications between the one or more peer devices and passively monitor communications between the one or more peer devices and one or more remote devices. In some examples, the monitoring comprises using an active monitoring mode, wherein the active monitoring mode enables the security device to request data packets and information from the one or more peer devices. In some examples, remediating the identified anomalous behavior comprises evaluating the one or more indicators of compromise, wherein the evaluating comprises parsing the IOC to determine at least one of: action-identifying information, sources to perform actions, threat classifications and threat analysis data.

Aspects of the present disclosure further provide a computer-readable storage medium encoding computer executable instructions which, when executed by at least one processor, performs a method for peer device protection, the method comprising: detecting one or more peer devices on a network; monitoring, by a security device, the detected one or more peer devices to generate monitored data, wherein the security device is a peer of the one or more peer devices and comprises a security solution; applying, by the security device, threat detection to the monitored data to identify anomalous behavior; generating one or more indicators of compromise corresponding to the identified anomalous behavior; and based on the one or more indicators of compromise, using the security device to remediate the identified anomalous behavior.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:
1. A system comprising:
one or more processors; and
memory coupled to at least one processor of the one or more processors, the memory comprising computer executable instructions that, when executed by the at least one processor, performs a method for peer device protection, the method comprising:
detecting one or more peer devices on a network;
monitoring, by a security device, the one or more peer devices to generate monitored data, wherein the security device is a peer of the one or more peer devices and comprises a security solution, and wherein monitoring the one or more peer devices comprises monitoring network communications between the one or more peer devices and a first remote device external to the network;
applying, by the security device, threat detection to the monitored data to identify anomalous network behavior;
generating one or more indicators of compromise corresponding to the identified anomalous network behavior; and
based on the one or more indicators of compromise, using the security device to remediate the identified anomalous network behavior.

2. The system of claim 1, wherein detecting the one or more peer devices comprises recording at least one of: peer device identification information, user information and network activity information.

3. The system of claim 1, wherein the monitoring comprises using a passive monitoring mode, wherein the passive monitoring mode enables the security device to passively monitor communications between the one or more peer devices and passively monitor communications between the one or more peer devices and one or more remote devices.

4. The system of claim 1, wherein the monitoring comprises using an active monitoring mode, wherein the active monitoring mode enables the security device to request data packets and information from the one or more peer devices.

5. The system of claim 1, wherein the monitoring comprises using an active monitoring mode, wherein the active monitoring mode enables the security device to cause a second remote device external to the network to assess at least one of the one or more peer devices.

6. The system of claim 1, wherein the monitored data is used to generate one or more behavior profiles representing at least one of expected behavior, expected network events, expected device states and expected network states.

7. The system of claim 6, wherein the one or more behavior profiles comprise at least one of:
network join events, network exit events, device state information, network state information and device trust levels.

8. The system of claim 1, wherein applying threat detection comprises:
parsing the monitored data to generate or identify a set of behavior features;
using the set of behavior features to construct one or more feature vectors; and
evaluating the one or more feature vectors to determine whether the monitored data is indicative of anomalous activity.

9. The system of claim 8, wherein evaluating the one or more feature vectors comprises evaluating the one or more feature vectors against at least one of: a behavior profile, a set of virus definitions, a list of device identifiers, a list of network identifiers and a behavioral model.

10. The system of claim 9, wherein evaluating the one or more feature vectors further comprises:
generating one or more threat values for features of the one or more feature vectors; and
applying the one or more threat values to a behavioral algorithm to generate an overall threat score.

11. The system of claim 1, wherein the one or more indicators of compromise comprise at least one of:
an identifier, a set of keywords, a link, an executable script and a set of instructions.

12. The system of claim 1, wherein remediating the identified anomalous network behavior comprises at least one of:
installing the security solution on at least one of the one or more peer devices;
executing the security solution for at least one of the one or more peer devices, wherein the security solution is executed from the security device;
modifying a configuration of one or more network devices on the network;
modifying a configuration of one or more peer devices;
interrupting network traffic between at least two of the one of the one or more peer devices;
interrupting network traffic between at least one of the one of the one or more peer devices and the first remote device; and
leveraging an external security solution to apply security to at least one of the one or more peer devices.

13. A method for peer device protection, the method comprising:
detecting one or more peer devices on a network;
monitoring, by a security device, the one or more peer devices to generate monitored data, wherein the security device is a peer of the one or more peer devices and comprises a security solution and wherein monitoring the one or more peer devices comprises monitoring network communications between the one or more peer devices and a first remote device external to the network;
applying, by the security device, threat detection to the monitored data to identify anomalous network behavior;
generating one or more indicators of compromise corresponding to the identified anomalous network behavior; and
based on the one or more indicators of compromise, using the security device to remediate the identified anomalous network behavior.

14. The method of claim 13, wherein detecting the one or more peer devices comprises using at least one of: a network scanning utility, a listener component and discovery protocols.

15. The method of claim 13, wherein the monitored data is used to generate one or more behavior profiles representing at least one of expected behavior, expected network events, expected device states and expected network states.

16. The method of claim 13, wherein the threat detection comprises the use of at least one of:
virus detection, threat vector generation and analysis, URL analysis, malware detection, network analysis, endpoint analysis and one or more threat models.

17. The method of claim 13, wherein the monitoring comprises using a passive monitoring mode, wherein the passive monitoring mode enables the security device to passively monitor communications between the one or more peer devices and passively monitor communications between the one or more peer devices and one or more remote devices.

18. The method of claim 13, wherein the monitoring comprises using an active monitoring mode, wherein the active monitoring mode enables the security device to request data packets and information from the one or more peer devices.

19. The method of claim 13, wherein remediating the identified anomalous network behavior comprises evaluating the one or more indicators of compromise, wherein the evaluating comprises parsing the one or more indicators of compromise to determine at least one of: action-identifying information, sources to perform actions, threat classifications and threat analysis data.

20. A computer-readable storage medium encoding computer executable instructions which, when executed by at least one processor, performs a method for peer device protection, the method comprising:
detecting one or more peer devices on a network;
monitoring, by a security device, the one or more peer devices to generate monitored data, wherein the security device is a peer of the one or more peer devices and comprises a security solution and wherein monitoring the one or more peer devices comprises monitoring network communications between the one or more peer devices and a remote device external to the network;
applying, by the security device, threat detection to the monitored data to identify anomalous network behavior;
generating one or more indicators of compromise corresponding to the identified anomalous network behavior; and
based on the one or more indicators of compromise, using the security device to remediate the identified anomalous network behavior.

* * * * *